Sept. 3, 1935.   G. M. REED   2,013,525

ELECTRICAL SWITCH GEAR

Filed April 18, 1934

Inventor:
George M. Reed
by Harry E. Dunham
His Attorney.

Patented Sept. 3, 1935

2,013,525

UNITED STATES PATENT OFFICE 2,013,525

ELECTRICAL SWITCH GEAR

George M. Reed, Yeadon, Pa., assignor to General Electric Company, a corporation of New York Application April 18, 1934, Serial No. 721,158

4 Claims. (Cl. 175—298)

My invention relates to electrical switchgear, more particularly to bus and switch units such as of the well known drop-down metal clad type, and has for its principal object the provision of an improved metal clad switchgear arrangement which shall be completely metal enclosed, compact and readily accessible, and neat in appearance.

It is often desirable to apply to metal clad bus and switch units means for mounting meters, instruments and relays without in any way interfering with accessibility to the oil circuit breaker or movable switch unit. In this type of switchgear the oil circuit breaker is generally mounted in the lower part of a housing for vertical reciprocal movement with respect to busbar and branch circuit connections mounted in the upper part of the housing, the arrangement being such that the oil circuit breaker and its associated operating mechanism are readily accessible for inspection and removable, if desired, from the aforesaid housing. This flexibility in operation and maintenance of the metal clad switchgear unit must be maintained notwithstanding addition of metering and control apparatus panels and associated structure.

In accordance with my invention the above problem is very satisfactorily solved by the use of an auxiliary housing in combination with the main metal clad bus and switch unit, the auxiliary housing more specifically being detachably connected to the front end of said unit so as completely to enclose the same and providing adequate and proper space for the various elements of the metering and control apparatus, said apparatus being mounted on a hinged panel which forms a door of said auxiliary housing through which access is readily had to the switchgear unit.

My invention will be more fully set forth in the following description referring to the accompanying drawing, and the features of novelty which characterize my invention will be pointed out with particularity in the claims annexed to and forming a part of this specification.

Figure 1:
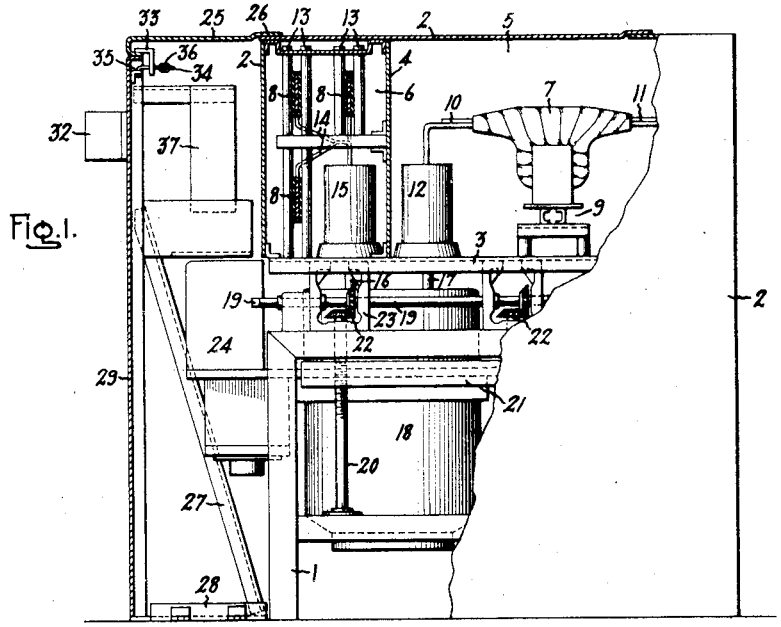
Figure 2:
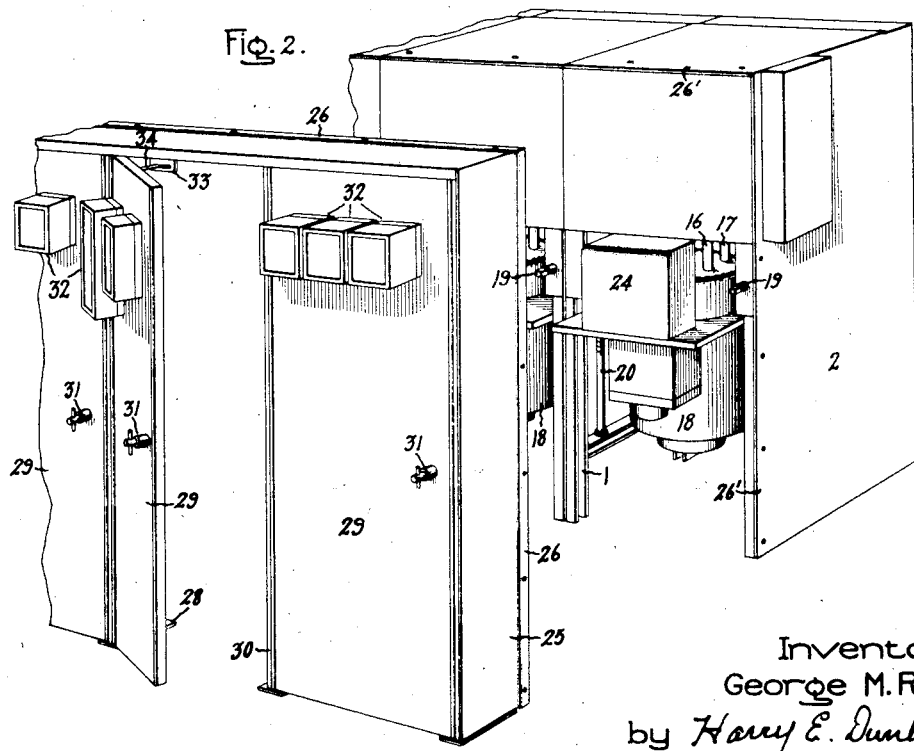

Referring to the drawing, Fig. 1 is an elevational side view, partly in section, of a metal clad bus and switch unit of the drop-down type embodying the present invention and Fig. 2 is an exploded view in perspective of a bus and switch station comprising a plurality of units as individually illustrated by Fig. 1.

The bus and switch unit illustrated by Fig. 1 comprises a box-like skeleton frame 1 which supports a sheet metal wall structure 2 forming an enclosure or cubicle-like structure housing the electrical apparatus of the unit. At the upper part of the structure sheet metal walls 3 and 4 form with the walls 2 a current transformer compartment 5 and a busbar compartment 6 for housing the usual current transformers 7 and phase busbars 8, respectively. The current transformer 7 is suitably insulated and mounted, as at 9, with respect to the wall 3 and is provided with terminal connections 10 and 11 which are electrically connected, respectively, to a stationary disconnect contact (not shown) disposed within an insulating shell 12, and a branch circuit as a feeder cable (not shown).

The phase busbars 8 are suitably insulated as indicated and mounted between insulating rods 13 secured at opposite ends with respect to the wall structure of the busbar compartment. The busbars 8 are provided with electrical connections 14 which likewise terminate in stationary disconnect contacts (not shown) within insulating shells 15. The insulating shells 12 and 15 are open at their lower ends and are mounted on the wall 3 in alinement with apertures therein so as to receive the movable disconnect contacts 16 and 17 carried by the oil circuit breaker 18.

The oil circuit breaker 18 is mounted in the lower part of the housing, as illustrated, for vertical reciprocal movement between connected and disconnected positions with respect to the stationary bus and branch circuit connections. As shown, the breaker is in the connected position, the stationary disconnect contacts within the shells 12 and 15 and the coacting movable disconnect contacts 17 and 16 being in engagement so that the circuit between the bus and branch circuit can be completed through the contact structure of the oil circuit breaker as well known in the art.

The elevating and lowering means for the oil circuit breaker comprises, in the present instance, a jackscrew arrangement including a main driving gear shaft 19 and jackscrews 20 which are connected to supporting members 21 of the circuit breaker. The driving gears 22 for the jackscrews are disposed within channel-like members 23 which provide bearings for the shafts 19 and 20 and support the wall 3 of the busbar and current transformer compartments.

The above-described bus and switch unit is likewise illustrated in Fig. 2, the oil circuit breaker having mounted thereon suitable operating mechanism 24, as of the solenoid type, so that the switch unit, comprising both the circuit breaker proper and its operating mechanism, may be bodily lowered to the disconnected position and moved from the front of the housing if desired.

In carrying out my invention as previously outlined, an auxiliary housing 25 is formed by sheet metal wall structure which is provided with flanges 26 adapted to engage and overlap corresponding edges 26' of the switchgear unit. As illustrated by Fig. 2, the coacting edges of the main and auxiliary housings may be detachably secured together as by bolts, the auxiliary housing being alined with the front end of the switchgear unit so as to form substantially a continuation thereof. The auxiliary housing 25 likewise is provided at the inner side thereof with bracing and reinforcing struts 27 connecting with angle members 28 which are secured to the auxiliary housing 25 so that the same is self supporting.

For the purpose of mounting the metering and control apparatus, the wall of the auxiliary housing directly opposite the corresponding end of the switchgear unit is provided with a hinged panel 29 forming a door through which access can be had to the interior of the auxiliary housing and to the switchgear unit. The panel 29 is mounted on concealed hinges secured to the stationary supporting strip 30 forming part of the auxiliary housing, and is provided with a suitable handle and latch device, generally indicated at 31, for swinging the panel outwardly. The metering and control apparatus, generally indicated at 32, is conveniently mounted on the hinged panel 29 exteriorly of the auxiliary housing and the electrical connections and terminal blocks therefor, generally indicated at 37, are housed within the space formed by the auxiliary housing. In the interest of clearness, the numerous electrical connections between the metering and control apparatus and the switchgear unit, including the solenoid operating mechanism, current transformers, etc., are omitted, it of course being understood that the aforesaid connections extend through the panel 29 to the terminal block carried at the rear of the panel from which the ends form a flexible and slack cable extending to the switchgear unit. Accordingly, it will be apparent that the auxiliary housing 25 not only provides a meter and relay panel which is most conveniently located for station attendants and provides an enclosed space for the low voltage secondary leads and terminal blocks therefor so that the aforesaid leads are not subject to injury, but also affords ready access to the switchgear unit proper without disassembling any of the equipment.

In order to limit the opening of the panel 29 so as to prevent unnecessary stretching of the secondary leads connected to the terminal block carried by the panel, suitable stop means are provided. A lug 33 slidably guides a rod 34 pivotally mounted at 35 on a lug secured to the panel 29. The free end of the rod 34 is provided with a stop member 36 which abuts the lug 33 and limits further opening of the panel.

The auxiliary housing 25 is adapted either for single units or for a bus and switch station comprising a number of units as illustrated in Fig. 2. As employed, the auxiliary housing not only converts the switchgear unit into a completely metal enclosed structure, which is highly desirable in itself, but also provides the usual metering and control facilities without in any appreciable degree hampering the normal operation of the switchgear unit. In addition, it will be apparent that the appearance of a bus and switch station embodying my invention is greatly improved. The structure forming the auxiliary housing or front enclosure may where desirable be provided with partitions defining the individual units.

Although I have shown my invention incorporated in bus and switch units of the drop-down type, it will be apparent that it is readily applicable to units of the well known draw-out type wherein the circuit breaker is moved horizontally instead of vertically between connected and disconnected positions. Furthermore, the term "busbar" is intended to include electrical conductors other than the usual flat horizontally arranged bars.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:—

1. Electrical switchgear of the metal-clad type comprising a box-like frame, busbar and branch circuit connections mounted in said frame, a circuit breaker mounted for reciprocal movement with respect to said connections, and an auxiliary housing connected to and in alinement with one end of said frame so as to form a continuation thereof, said housing including a hinged instrument and control panel forming a door through which said circuit breaker may be moved from said frame.

2. The combination with a switchgear unit of the metal-clad type including a box-like supporting frame, busbar and branch circuit connections mounted in the upper part of said frame and a circuit breaker mounted in the lower part of said frame adjacent one end thereof for vertical reciprocal movement with respect to said connections of sheet metal structure forming an auxiliary housing connected to and alined with respect to the aforesaid end of said frame so as to form a continuation thereof, a wall of said auxiliary housing including a hinged instrument and control panel through which said circuit breaker may be moved from said frame.

3. The combination with a switchgear unit of the metal-clad type including a box-like supporting frame, busbar and branch circuit connections mounted in said frame and a circuit breaker mounted in said frame adjacent one end thereof for vertical reciprocal movement with respect to said connections, of sheet metal structure forming a separate auxiliary housing having an end and side walls detachably connected to the aforesaid end of said frame, said end wall including a hinged instrument and control panel through which access may be had to said switchgear unit.

4. An electrical switchgear unit of the metal-clad type comprising a box-like frame, busbar and branch circuit connections mounted in said frame, a circuit breaker mounted for reciprocal movement with respect to said connections and an auxiliary sheet metal housing detachably connected to and in alinement with one end of said frame so as to form a continuation thereof, said housing including a hinged instrument and control panel forming a door through which said circuit breaker may be removed from said unit.

GEORGE M. REED.

CERTIFICATE OF CORRECTION.

Patent No. 2,013,525.

September 3, 1935.

GEORGE M. REED.

It is hereby certified that error appears in the printed specification of the above numbered patent requiring correction as follows: Page 2, first column, line 43, for "ends" read leads; and second column, line 42, claim 2, before the word "of" insert a comma; and that the said Letters Patent should be read with these corrections therein that the same may conform to the record of the case in the Patent Office.

Signed and sealed this 8th day of October, A. D. 1935.

(Seal)

Leslie Frazer
Acting Commissioner of Patents.